United States Patent [19]
Silverstein

[11] Patent Number: 6,038,557
[45] Date of Patent: Mar. 14, 2000

[54] METHOD AND APPARATUS FOR ALMOST-CONSTANT-TIME CLUSTERING OF ARBITRARY CORPUS SUBSETS

[75] Inventor: Craig D. Silverstein, Stanford, Calif.

[73] Assignee: Xerox Corporation, Stamford, Conn.

[21] Appl. No.: 09/013,668

[22] Filed: Jan. 26, 1998

[51] Int. Cl.[7] .................................................. G06F 17/30
[52] U.S. Cl. ........................................ 707/1; 707/3; 707/5
[58] Field of Search ........................................ 707/1, 3, 5

[56] References Cited

U.S. PATENT DOCUMENTS

| | | | |
|---|---|---|---|
| 5,317,507 | 5/1994 | Gallant | 364/419.13 |
| 5,442,778 | 8/1995 | Pedersen et al. | 707/5 |
| 5,483,650 | 1/1996 | Pedersen et al. | 707/2 |
| 5,619,709 | 4/1997 | Caid et al. | 395/794 |

Primary Examiner—Thomas G. Black
Assistant Examiner—William Trinh
Attorney, Agent, or Firm—Oliff & Berridge, PLC

[57] ABSTRACT

A method and apparatus for almost-constant-time re-clustering of corpus subsets with customizable time/precision tradeoff, is usable in a basic browsing method, such as Scatter/Gather, to successfully partition a large document collection into clusters of related documents. The user is first presented with a clustering of the entire corpus into metadocuments from which the worst metadocument is selected and replaced with its "children". Children containing no documents of interest are pruned and the remaining metadocuments are further expanded until a predetermined number of children metadocuments are obtain. The resulting metadocuments are then reclustered. The process is repeated until the user obtains the desired degree of specificity.

20 Claims, 10 Drawing Sheets

METHOD AND APPARATUS FOR ALMOST-CONSTANT-TIME CLUSTERING OF ARBITRARY CORPUS SUBSETS

BACKGROUND OF THE INVENTION

1. Field of the Invention

This invention relates to a method and apparatus for an almost-constant-time clustering of electronic documents. In particular, this invention is directed to partitioning a large corpus of electronic documents into a much smaller set of clusters at nearly constant time.

2. Description of Related Art

Document browsing is a powerful tool used in accessing large text collections. Browsing, which can be distinguished from searching because browsing is query-free, works well for information needs either too general or too vague to be usefully expressed as a query in some search language. For example, a user may be unfamiliar with vocabulary appropriate for describing a topic of interest, or may not wish to commit to a particular choice of words. Indeed, a user may not be looking for anything specific at all, but instead may wish to explore the general information content of the collection.

An information access system is helpful in this context. The information access system includes a navigable collection outline that both suggests the collection's contents and allows a user to focus attention on some topic-coherent subset of the contents. Such browsing systems are described, for example, in U.S. Pat. Nos. 5,442,778 to Pedersen et al. (Scatter/Gather) and 5,483,650 to Pedersen et al., each incorporated herein by reference in its entirety.

In Scatter/Gather, attention is always directed toward a focus set of documents potentially interesting to a user. Initially, the focus set may be an entire document collection. The documents in the focus set are clustered into a small number of topic-coherent subsets, or clusters, of documents. The terms "clustering" and "scattering" are used synonymously; thus it may be said that the documents in the focus set are scattered into the clusters.

In Scatter/Gather, cluster summaries are developed and presented to the user. The cluster summaries are usually tables of contents outlining the documents of the focus set. Cluster summaries include suggestive text determined automatically from the documents in each cluster. Each cluster summary includes two types of information: a list of topical words occurring most often in the documents of the cluster; and the titles of a few typical documents in the cluster. The summaries are based on cluster profiles, which reflect words appearing in documents in the cluster.

The user then identifies and selects clusters that appear most interesting. The selected clusters are gathered together to define a new, smaller focus set That is, the new focus set is the union of the documents in the selected clusters. The process is repeated a desired number of times until the user wishes to access documents individually or to employ a query-based search method.

Scatter/Gather is not necessarily a stand-alone information access tool. Rather, Scatter/Gather can be used in tandem with search methods such as boolean searching or similarity searching. An illustrative analogy is reference books, which offer two access modes: a table of contents in the front for browsing, and an index in the back for more directed searches. Scatter/Gather is not necessarily used to find particular documents. Rather, by giving exposure to the vocabulary presented in cluster summaries, Scatter/Gather helps guide complementary search methods. For example, a cluster profile may be used in a similarity search as a query against the entire collection. Conversely, Scatter/Gather can be used to organize the results of word-based queries that retrieve too many documents.

FIG. 9 represents a Scatter/Gather process applied to a text collection of about 5,000 articles posted to the New York Times News Service in August, 1990. In FIG. 9, single-word labels instead of actual cluster summaries are presented to more simply illustrate the Scatter/Gather process.

In the example shown in FIG. 9, a user's information need is to determine generally what happened in August 1990. It would be difficult to construct a word-based query effectively representing this information need, because no specific topic description exists. The user might consider general topics, such as "international events," but that topic description would not be effective because articles concerning international events typically do not use those words.

With Scatter/Gather, rather than being forced to provide certain terms, a user is presented with a set of cluster summaries—an outline of the collection. The user need only select those clusters that seem potentially relevant to the topic of interest. In the Scatter/Gather process shown in FIG. 9, the major stories of the month are immediately obvious from the initial scattering: Iraq invades Kuwait, and Germany considers reunification. This leads a user to focus on international issues, selecting the "Iraq," "Germany," and "Oil" clusters. These three clusters are gathered together to form a smaller focus set.

This smaller focus set is then clustered or scattered to produce eight new clusters covering the reduced collection. Because the reduced collection contains only a subset of the articles, these new clusters reveal a finer level of detail than the original eight clusters. The articles on the Iraqi invasion and some of the oil articles have now been separated into clusters discussing the U.S. military deployment, the effects of the invasion upon the oil market, and hostages in Kuwait.

If the user adequately understands these major stories, but wishes to discover what happened in other parts of the world, the user can, for example, select the "Pakistan" cluster—which also contains other foreign political stories—and a cluster containing articles about Africa. Scattering these clusters reveals a number of specific international situations as well as a small collection of miscellaneous international articles. The user thus learns of a coup in Pakistan and about hostages being taken in Trinidad, stories otherwise lost among the more major stories of that month.

FIG. 10 shows a further illustration of Scatter/Gather in operation. In the example shown in FIG. 10, the text collection (or focus set) 20 is an online-version of Grolier's encyclopedia. Each of the twenty-seven thousand articles in the focus set is treated as a separate document. In the example shown in FIG. 10, the user is interested in investigating the role of women in the exploration of space. Rather than attempting to express this information need as a formal query, the user is instead presented with a number of top-level clusters 22A–22I that, from their description, seem relevant to the topic of interest. The user then selects the MILITARY HISTORY cluster 22A, the SCIENCE AND INDUSTRY detector 22C and the AMERICAN SOCIETY cluster 22H to form a reduced corpus (or focus set) 24 of the indicated subset of articles from Grolier's.

The reduced corpus is then reclustered on the fly to produce a new set of clusters 26A–26J covering the reduced corpus 24. Since the reduced corpus contains a subset of the articles in Grolier's, these new clusters are at a finer level of detail than the top-level clusters 22A–22I. The user again selects clusters of interest. In this case, these include the AVIATION cluster 26E, the ENGINEERING cluster 26G and the PHYSICS cluster 26H. Again, a further reduced corpus 28 is formed and reclustered. The final set of clusters 30A–30F includes a MILITARY AVIATION cluster 30A, an APOLLO PROGRAM cluster 30B, an AEROSPACE INDUSTRY cluster 30C, a WEATHER cluster 30D, an ASTRONOMY cluster 30E and a CIVIL AVIATION cluster 30F. At this stage, the clusters are small enough for direct perusal via an exhaustive list of article titles. Assuming at least one article of interest is found, the user may find more articles of a similar nature in the same cluster or may use a directed search method, possibly based on the vocabulary of the located article or of the cluster description, to find additional articles.

Previous work in document clustering includes linear-time procedures, such as those described in Scatter/Gather and the 650 patent, to reduce the time required for clustering to only a few minutes. This is fast enough to search moderately large collections using broad word-based queries. For example, a rate of approximately 3000 documents per minute may be achieved on a Sun Microsystems SPARCSTATION 2 using Scatter/Gather. Even linear-time clustering, however, is too slow to support interactive browsing of very large document collections. This is particularly apparent when one considers applying Scatter/Gather to the TIPSTER collection, a DARPA standard for text retrieval evaluation containing about 750,000 documents. At 3000 documents per minute, this requires over four hours to scatter—far too long to be considered interactive. Thus, faster and more efficient ways to cluster documents must be found.

SUMMARY OF THE INVENTION

This invention provides a method and apparatus for almost-constant-time clustering of corpus subsets with a customizable time/precision tradeoff.

This invention also provides a method for almost-constant-time reclustering useable in a basic browsing method, such as Scatter/Gather, to efficiently partition a large document collection into clusters of related documents.

In the reclustering method and apparatus of this invention, the input is a clustering of the entire corpus into metadocuments from which the "worst" metadocument is selected. The "worst" metadocument is replaced by its children and those children containing no documents of interest are pruned. The remaining metadocuments are then gathered together and reclustered. The process is repeated until the user obtains the desired degree of specificity.

This clustering method is faster than the conventional methods, in that it treats clusters as documents in their own right and uses the existing hierarchy to produce a new set of clusters. That is, in the reclustering method and apparatus of this invention, the clusters are treated as metadocuments to be clustered as if they were a large individual document. Thus, for a cluster hierarchy with a fan-out k, the reclustering method and apparatus of this invention starts from the smallest cluster and replaces each cluster with its k children. The parent clusters are examined and the "worst" one is pruned. That is, the "worst" parent cluster is replaced with its k children. The process is repeated until a predetermined number of clusters is reached.

These and other features and advantages of this invention are described in or are apparent from the following detailed description of the preferred embodiments.

BRIEF DESCRIPTION OF THE DRAWINGS

The invention will be described in detail with reference to the following drawings, in which like reference numerals refer to like elements.

DETAILED DESCRIPTION OF PREFERRED EMBODIMENTS

Figure 1:
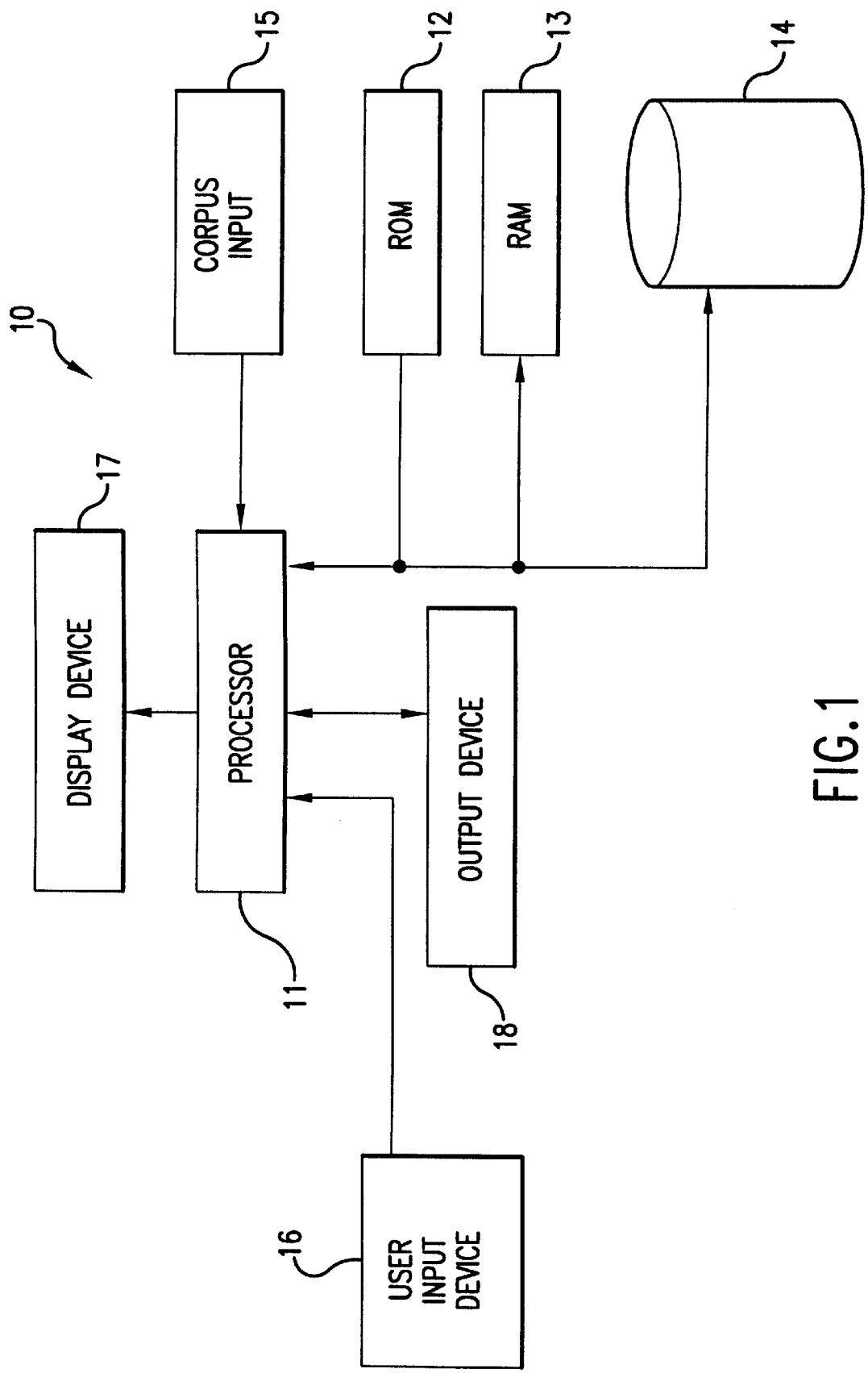
FIG. 1 is a block diagram of one embodiment of the apparatus according to this invention.

FIG. 1 shows a block diagram of one embodiment of a reclustering system 10 according to this invention. The system 10 includes a processor 11, a ROM 12, a RAM 13, a non-volatile memory 14, a corpus input 15, a user input device 16, a display device 17 and an output device 18.

Prior to performing a browsing procedure, a document corpus is input from a corpus input 15. The document corpus is then partitioned by the processor 11. The results of the partitioning procedures are displayed on the display device 17. The operator can input commands and data through a user input device 16, such as, for example, a mouse, a keyboard, a touch screen, a stylus or combinations of these elements. The user can output hard copies of documents, as well as print-outs containing Cluster Digest summaries, to an output device 18, such as a printer.

Conventionally, the processor 11 prepares an initial ordering of the documents. The initial ordering can be prepared by using, for example, the fractionation method disclosed in Scatter/Gather.

The processor 11 also determines a summary of the initial ordering of the corpus which can be displayed on the display device 17 or output on the output device 18 to the user. This summary can be determined by using, for example, the cluster digest method disclosed in Scatter/Gather.

After receiving appropriate instructions from a user via the user input device 16, the processor 11 can perform a further ordering of the corpus. This further ordering can be provided by using, for example, the buckshot method described in Scatter/Gather. A desired number of iterations of these steps can then be performed to further narrow the corpus. Eventually, individual documents might be examined or some directed search tool applied to the restricted corpus.

Figure 2:
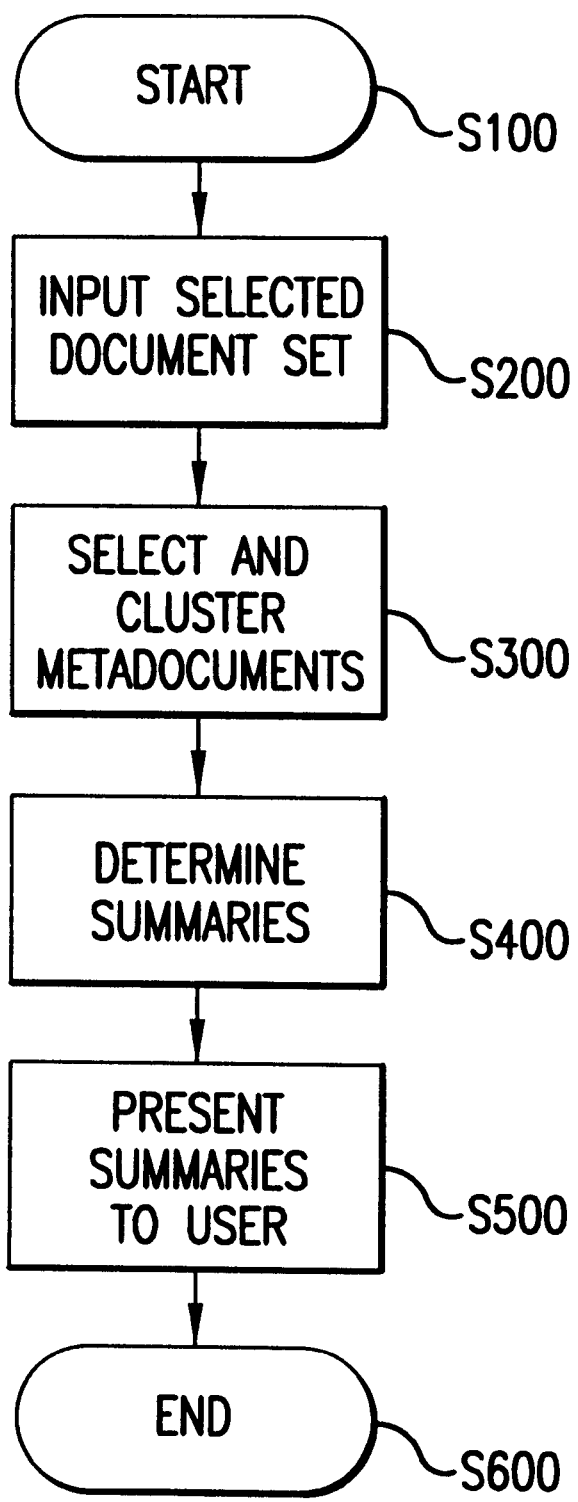
FIG. 2 is a flowchart outlining one embodiment of the reclustering method of this invention.

FIG. 2 outlines one embodiment of the reclustering method of this invention. The process begins at step S100 and continues to step S200. In step S200, the user selects a document set representing a portion of the entire document collection or corpus. For later iterations, the focus set contains metadocuments that each represent only a part of the collection. The number of metadocuments in the metadocument set is approximately equal to a predetermined maximum number, which could be, for example, 500 or 1000. Then, in step S300, an initial metadocument set is selected and clustered by the processor 11. Preferably, the predetermined number of metadocument clusters is 10. Generally, all that is necessary is that the predetermined number of new metadocuments be less than the predetermined maximum number of subsequent metadocuments. The process of selecting and clustering metadocuments is described in greater detail below with respect to FIGS. 3 and 4. Control then continues to step S400.

In step S400, the new metadocuments are summarized into a usable form. Then, in step S500, the summaries then presented to the user using, for example, the display device 17 or the output device 18. The process then continues to step S600, where the process stops.

The metadocument set has a cluster hierarchy H having a fan-out of k children and a root node r. The hierarchy is a tree structure of clusters, called nodes which represent metadocuments, such that the union of the k children of a node 1 has the same documents as the node 1 itself. A set of documents S is input to the clustering routine. This process results in a set of k clusters that includes exactly the documents in S.

Figure 3:
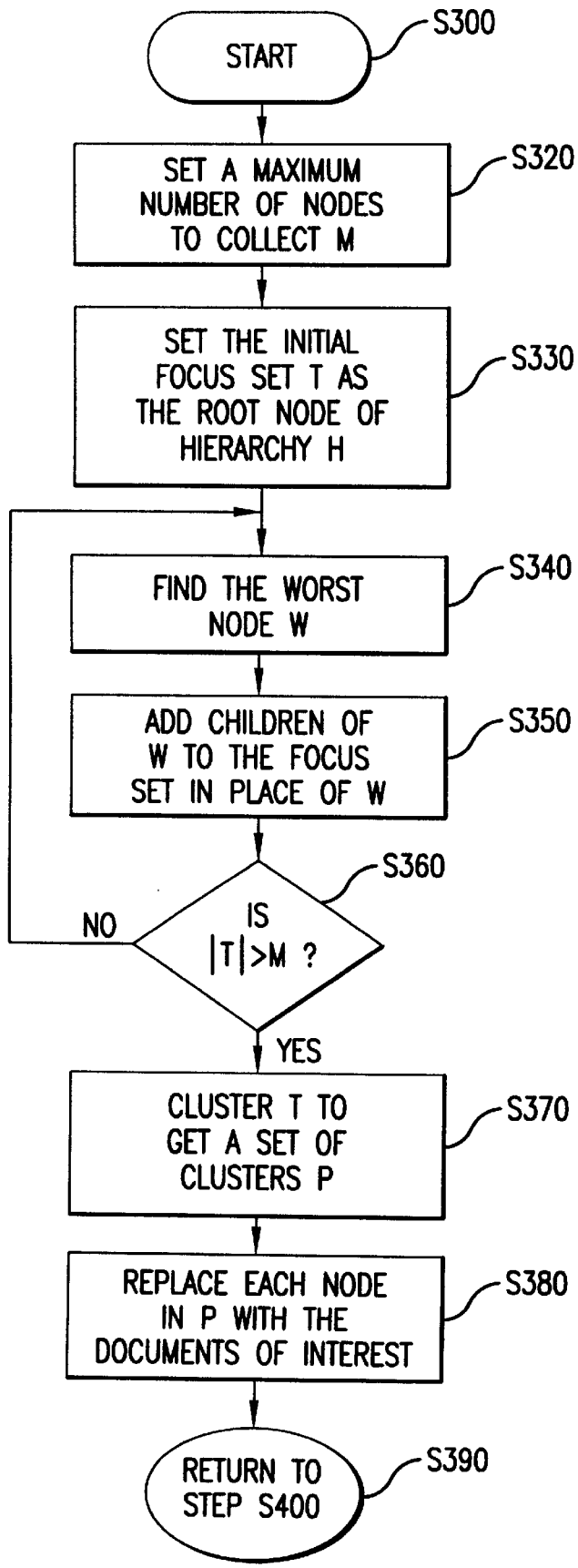
FIG. 3 is a flowchart outlining in greater detail a first embodiment of the metadocument expansion step of FIG. 2.

FIG. 3 outlines in greater detail a first embodiment of the metadocument selection and clustering step S300 of FIG. 2. Beginning at step S300, control proceeds to step S310. In step S320, a maximum number M of nodes to be collected is set. Next, in step S330, the initial focus set T is set as the root node r of a hierarchy H. The root note is then immediately replaced with its k children. Control then continues to step S340.

In steps S340–S360, the nodes of interest are found in the cluster hierarchy that are "good" in some way. The nodes of interest are nodes that contain documents of interest to the user. Methods for determining "goodness" of the nodes are discussed in detail below.

In step S340, the k nodes in the focus set T are examined and the "worst" one is picked. The "worst" node is determined by the "goodness" tests set forth below. Then, in step S350, the "worst" node is removed and replaced with those of its k children that contain documents of interest. The children that do not contain documents of interest are not included and are effectively "pruned".

Next, in step S360, the control routine determines whether the focus set T has a number of nodes that is equal to or greater than the maximum number M of nodes to be collected. If the number of nodes in the focus set T is less than the maximum number M of nodes to be collected, control jumps back to step S340. Otherwise, if the number of nodes in the focus set T is at least equal to M, control continues to step S370.

In step S370, the focus set T is clustered to obtain a set of clusters P. Then, in step S380, each node in this set of clusters P is replaced by the documents of interest $I_S(n)$ in order to eliminate documents in the clusters that were not in S. Control then continues to step S390, which returns control to step S400.

In the above clustering process, the M nodes found are clustered using a linear-time clustering method. As long as the number of nodes selected is bounded, this gives constant-time clustering.

Because the number of nodes in the cluster hierarchy may be large, all the nodes cannot be examined to find "good" ones. Instead, the cluster hierarchy fans out from the top. It starts with the root node of the hierarchy H, which is immediately replaced with its children. The k nodes in the resulting set are examined and the "worst" one is picked. The "worst" node is removed and replaced with its k children. The process is repeated on the 2k-1 nodes now under consideration. In reality, all k child nodes are not always included. Rather only a subset of the child nodes are considered. When M nodes are collected, the process is stopped.

At this point, an intersection table $I_S$ is generated. For any node n, the intersection $I_S(n)$ of that node is the set of documents in S∩n. That is, $I_S(n)$ is the intersection between the document set S and documents contained in the node n. Thus, the intersection table $I_S$, will provide only those documents of interest contained in both the document set S and the node n. $I_S$ is constructed in $|S|\log(n)$ time. The intersection table $I_S$ is used to replace each resulting node n by the intersection $I_S(n)$, to eliminate documents in the clusters that were not in the document set S. The resulting nodes are clustered into k clusters, and each node is still treated as a single entity.

To calculate the intersection of S and n for an arbitrary node n, a function is used that takes a document and returns all the nodes of the hierarchy H that contain the document. This function does not depend on the document set S and can be determined at the same time the hierarchy H is determined. Since the hierarchy H has a constant fan-out of k, it has depth log n and thus each document is in log n nodes.

To calculate $I_S$, a table is constructed and indexed by nodes. Each entry of the table is originally empty. For each document in the document set S, the precomputed function mentioned above is used to find which nodes contain the document. The document set is then added to the table entry for each such node. It is, in theory, possible to construct an empty table of arbitrary size in constant time, though in practice the obvious linear-time algorithm is quite fast. Updating the table takes time log n per document, or time $|S|\log n$ total. The resulting table is $I_S$, the required intersection-calculating tool.

Figure 4:
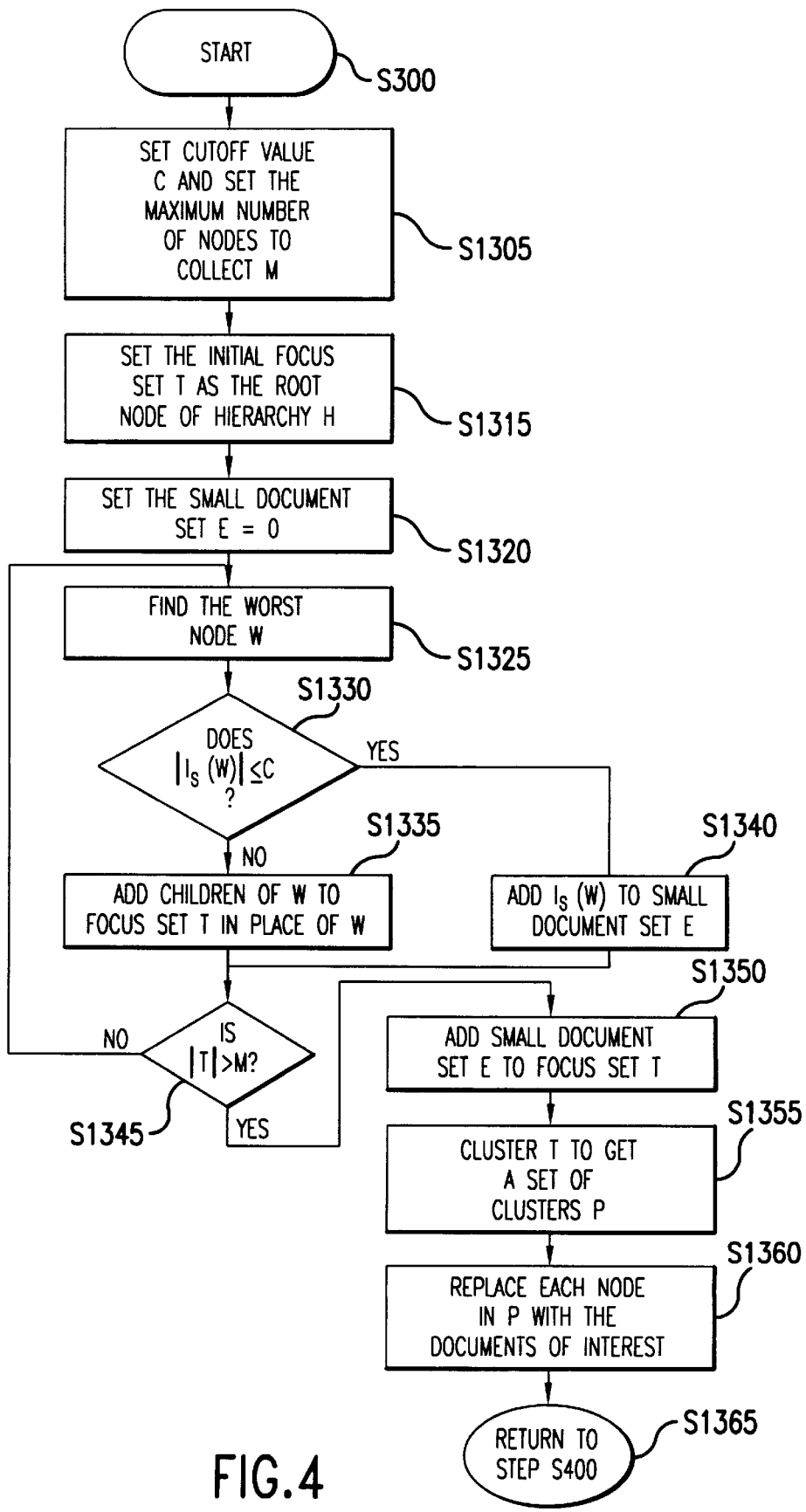
FIG. 4 is a flowchart outlining in greater detail a second embodiment of the metadocument expansion step of FIG. 2.

FIG. 4 outlines in greater detail a second embodiment of the metadocument selection and clustering step S300 of FIG. 2, illustrating how nodes for an arbitrary data set with cutoff values added are determined. Beginning at step S300, control continues to step S1305. Then, in step S1305, a cutoff value is set c, so that nodes containing less than c documents can be replaced by c single-document nodes. Again, the maximum number of nodes M to collect is also set. Next, in step S1315, an initial focus set T is set as the root node of the hierarchy H. Control then continues to step S1320.

In step S1320, the small document set E is set to zero. Next, in step S1325, the k nodes in the focus set are examined and the "worst" one is picked. Then, in step S1330, the "worst" node is checked to determine if it contains a number of documents of interest less than or equal to the cutoff value c. If the number of documents in the node are less than the cutoff value c, control continues to step S1335. Otherwise, if the selected node does not include a number of documents below the cutoff value c, control jumps to step S1340.

In step S1335, the number of documents in the node are added to a small document set E. Control then jumps to step S1345. In step S1340, the children of the node that contain documents of interest are added to the focus set T. The children that do not contain documents of interest are not included and are effectively "pruned". Control then continues to step S1345.

In step S1345, the focus set is checked to determine whether it has reached the maximum number of nodes M to be collected. If the maximum number of nodes m to be collected has been reached, control continues to step S1350. Otherwise, control jumps back to step S1325, to find the next "worst" node.

In step S1350, the small document set E is added to the focus set T. Then, in step S1355, the focus set T is clustered to get a set of clusters P. Next, in step S1360, each node P is replaced by documents of interest $I_S(n)$. Control then continues to step S1365. In step S1365, control returns to step S400 in FIG. 2.

Thus, for an arbitrary data set with cutoff values added, if a node includes just a few documents from the document set S, those documents are added to a separate set E instead of spending time expanding the node.

When replacing a node with its children, "empty" children, that is, children that do not contain any documents in the document set S, can be clearly avoided. "Singleton" children, i.e., children that contain only one document from the document set S, can also be specially handled. The entire node is not included when there is only one document in it. The document is simply taken and treated as its own node. This is equivalent to replacing the child node by an appropriate leaf descendent. In general, nodes containing less than the cutoff value c documents can be replaced by c single-document nodes. Since only a constant number of nodes are examined, the number of new nodes created this way is also a constant.

Since it is undesirable to let the value of c affect how many nodes are expanded, the single-document nodes are counted separately from normal nodes. That is, rather than keeping single-document nodes in the focus set T, the single-document nodes are moved into the separate set E. This process continues until the focus set T reaches a given size. Since |E| is bounded by a constant, this does not affect the analysis of the running time.

There are several "goodness" tests which may be used, for example, in step S340 of FIG. 3 and step S1325 of FIG. 4, to determine the "worst" node. One goodness test that may be used is a precision or RATIO test. A node is "good" if most of the documents it contains are also documents of interest from the document set S.

For example, n is a node having d documents. The goodness g of n is then:

$$g = |I_S(n)|/d.$$

The function f(S,T) returns the node in the focus set T with the lowest goodness. Since this function favors nodes with few matches, which probably have children with no matches, this goodness test will result in extensive pruning, improving the results. On the other hand, large nodes with fairly good ratios will stay intact in the focus set T, even though they include many non-matching documents in absolute terms.

If one large node contains many documents in the document set S, the RATIO test will tend to favor it. This can be a problem for clustering, since the clustering method will treat all the documents in the node as a single entity, leading to potentially lopsided cluster sizes. The expansion of such large nodes can be encouraged by weighting the goodness value. For example, a node n has d documents. Then the weighted goodness g' of the node n is:

$$g' = \sqrt{|I_S(n)|}/d.$$

In this case, having a lot of documents in the document set S is not a guarantee of a good ratio. Actually, it is more advantageous to have a smaller number of documents d. This helps ensure that the output nodes will all have approximately an equal number of documents from the document set S.

Another approach for deciding the goodness is to use an information theoretic measure. A node is a good candidate for replacement by its children if its children encode more information about the document set S than the node itself. This implies that the matches in the parent are unevenly distributed among the children, so that bad children may be pruned and the good ones kept.

For example, a node n has a size d. Then, the nodes $n_i$ are the children of the node n, and have sizes $d_i$. The information I(n) in the node n is then:

$$I(n) = -\frac{|I_S(n)|}{d}\log_2\left(\frac{|I_S(n)|}{d}\right).$$

The information gain G(n) for the node n is:

$$G(n) = I(n) - \sum_i \frac{|d_i|}{|d|} I(n_i).$$

The appropriate goodness measure for the node n is given by G(n). The function f(S,T) returns the node in the focus set T with the highest information gain. This has the advantage of picking nodes that will benefit the most from being replaced by their children. Disadvantageously, this will ignore large nodes with few matches if these matches are distributed evenly among the children.

In this invention, a predetermined number of metadocuments, instead of a non-predetermined number of individual documents, are used in the procedures for clustering or scattering. A metadocument represents a plurality of individual documents descending from the metadocument in a tree, such as a tree 81 of FIGS. 5–8.

For the following discussion of FIGS. 5–8, according to the invention, the "worst" metadocument may be chosen using one of several "goodness" tests, such as the RATIO test discussed above. However, for ease of discussion, in FIGS. 5–8 the "worst" metadocument will simply be selected by choosing the metadocument with the least number of documents of interest.

Figure 5:
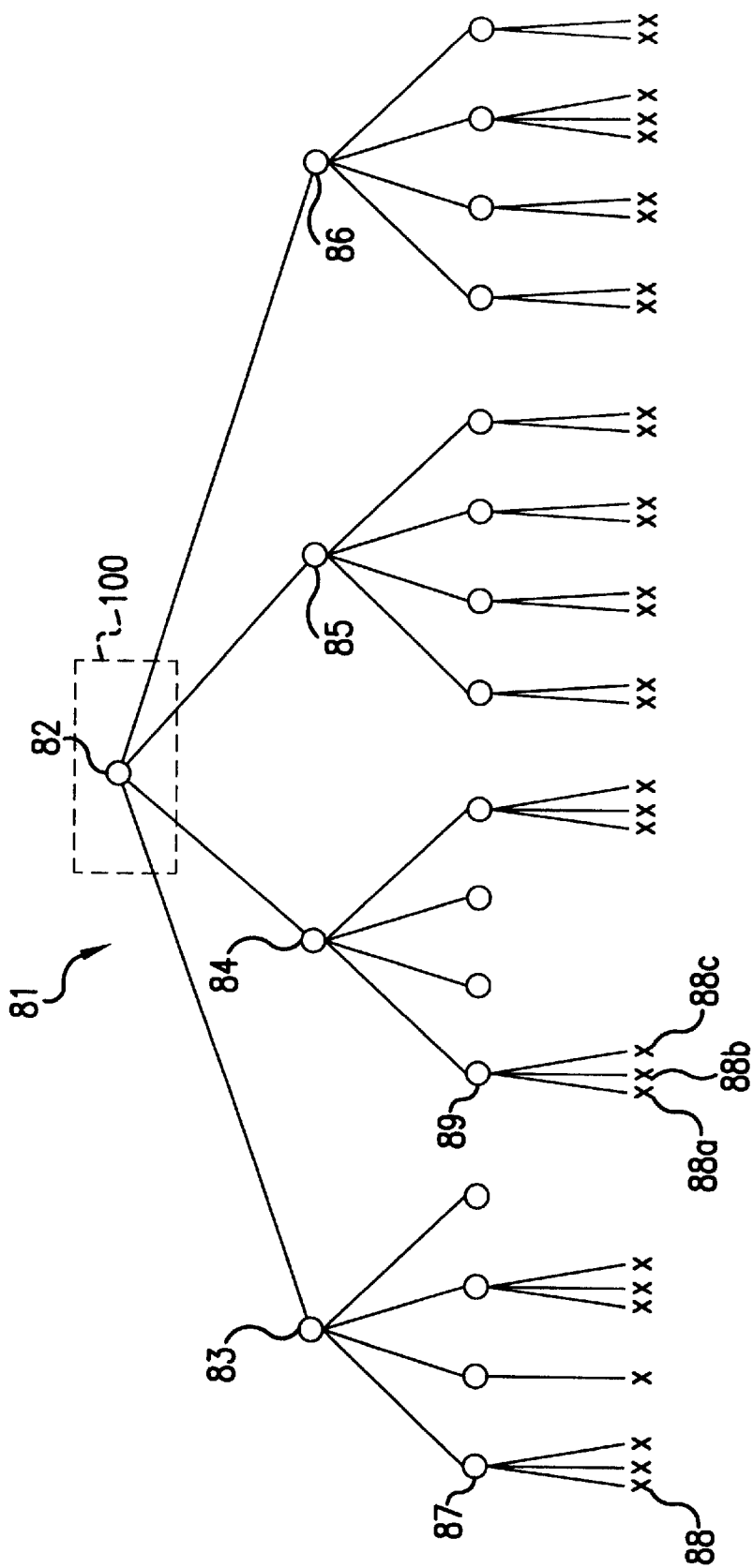
FIGS. 5–8 show trees and the changing contents of a focus set according to a preferred embodiment of the invention.

In FIG. 5, the nodes 82–86 of the tree 81 are metadocuments that represent collections of individual documents, such as the documents 88. For example, in FIG. 5, the node 89 is an internal node that has three children, the documents 88a, 88b, 88c. The internal node 89 is also a child of the internal node 84, which itself is a child of the root node 82. The root node 82 is a metadocument representing the entire document collection. The metadocuments 83–86 descend directly from the metadocument 82. A further level 87 of metadocuments 89 descends directly from the metadocuments 83–86. Finally, the individual documents 88, or leaves of the tree, descend directly from the metadocuments 87. The tree 81 is greatly simplified for illustration purposes. In reality; a large corpus has too many individual documents and levels of metadocuments to be conveniently illustrated.

As one example, 10,000 documents are to be clustered into ten topic-related groups, or clusters. In this example, an original clustering of the same 10,000 documents into, for example, 500 clusters is already available. All the documents in a given one of the 500 clusters will likely appear in the same one of the desired ten clusters, because documents extremely similar to each other usually appear in the same cluster. In other words, documents similar enough to be clustered together in a fine-grained clustering will be clustered together in a coarse-grained clustering. This is the cluster refinement hypothesis described in the 650 patent.

This invention treats the existing clusters as metadocuments, which together form a condensed representation of the entire corpus. Instead of clustering all of the individual documents directly, the invention clusters the metadocuments that represent them. In the above example, instead of clustering the 10,000 individual documents, the invention could cluster the 500 metadocuments. Under the cluster refinement hypothesis, metadocument clustering and individual document clustering yield similar results.

Figure 6:
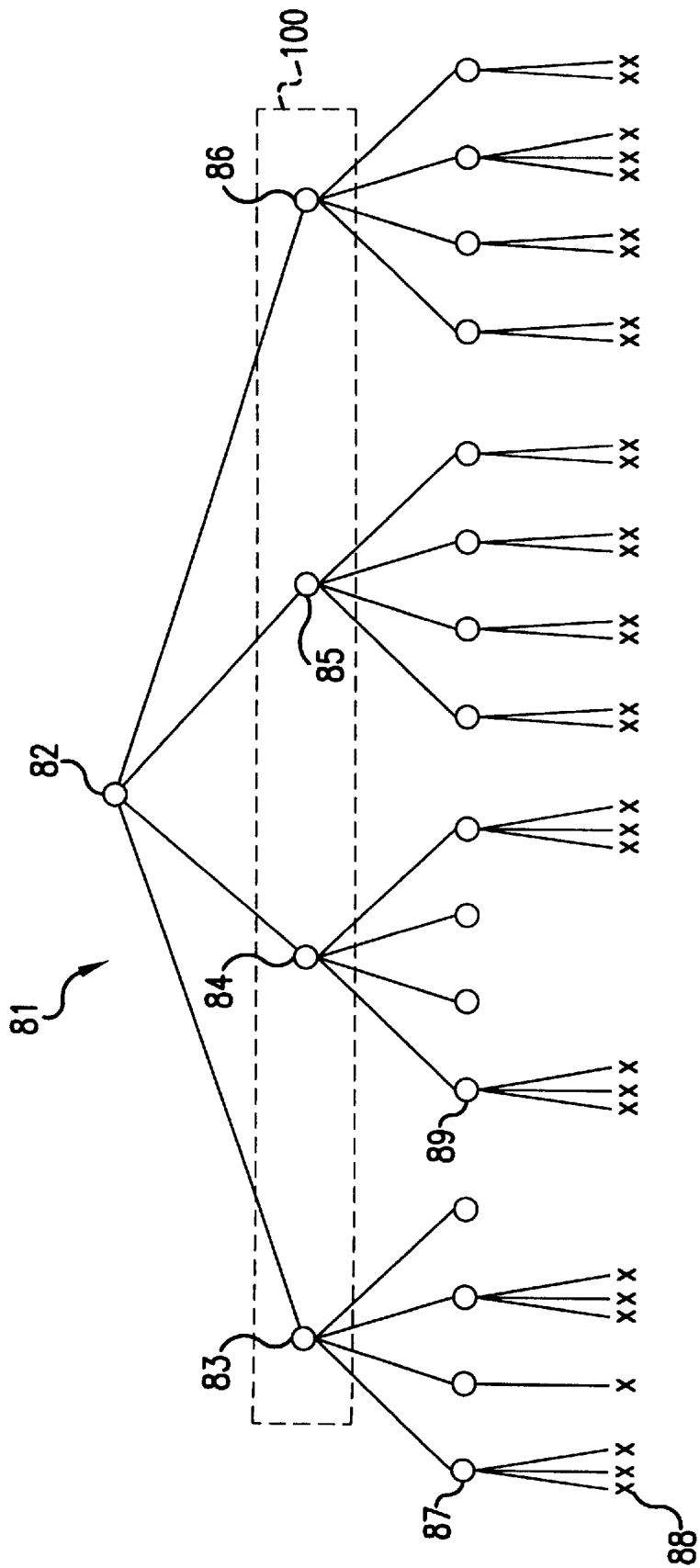

For example, for the first iteration of steps S340–S360, a focus set 100 of FIG. 5 contains only the root node or metadocument 82, representing the entire document collection or corpus. Of course, during the first iteration, this metadocument 82 is chosen in step S340, as it is the only metadocument in the focus set T. In step S350, the metadocument 82 is expanded into its direct descendant, or children, metadocuments 83–86. These children metadocuments 83–86 are then used to replace the metadocument 82 in the focus set 100, as shown in FIG. 6. The focus set 100 thus contains the descendant metadocuments 83–86.

Figure 7:
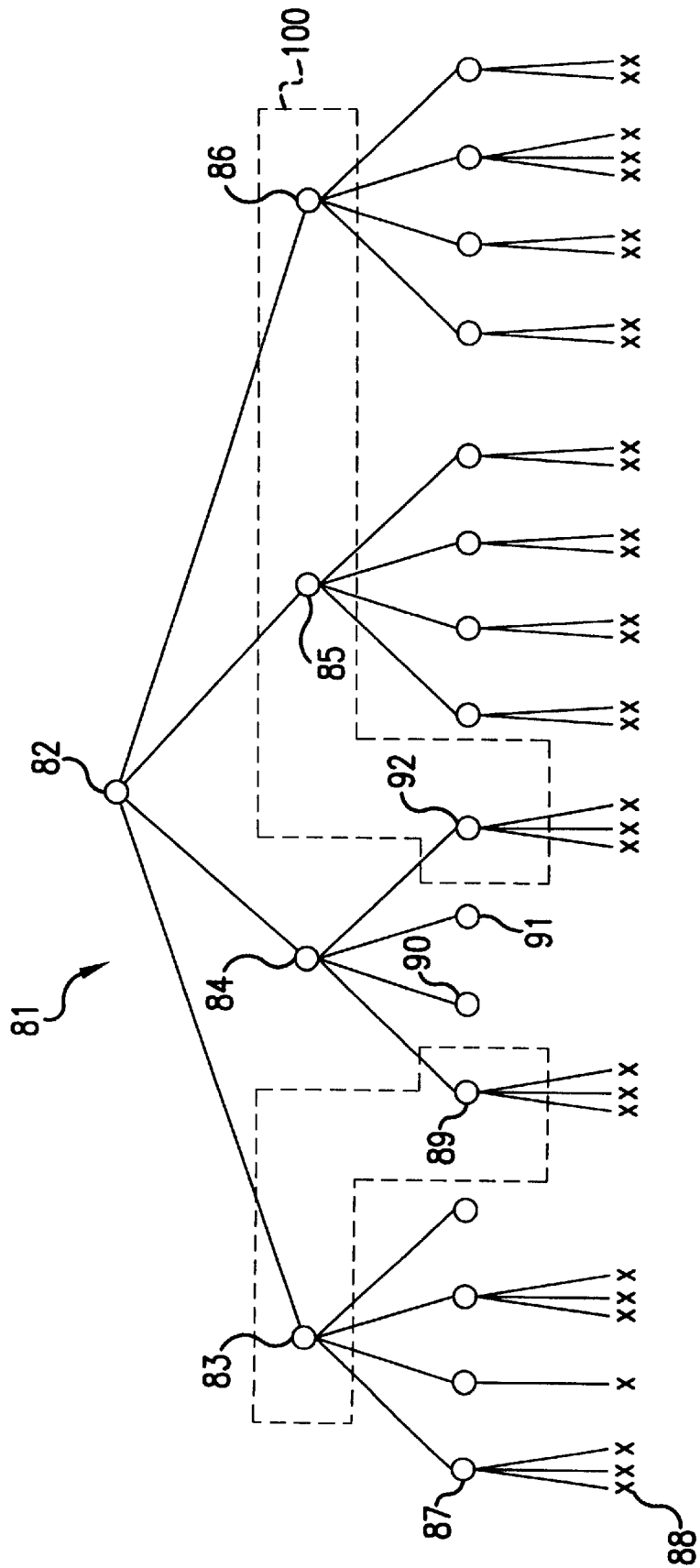

Step S340 is then repeated with respect to the focus set 100 of FIG. 6. As long as the number of metadocuments in the focus set 100 is less than the predetermined maximum number in step S360, the clustering process will continue to loop through steps S340–360. Of the metadocuments 83–86, the metadocument 84 represents the least number of individual documents 88. That is, the metadocument 84 represents six individual documents, while the metadocuments 83, 85, and 86 respectively represent seven, eight and nine individual documents. The metadocument 84 is therefore chosen and expanded into its descendant, or grandchildren, metadocuments 89–92, as shown in FIG. 7. However, since the grandchildren metadocuments 90 and 91 do not include any documents of interest, they are pruned. Therefore, the focus set 100 now contains the metadocuments 83, 85–86, 89, and 92.

Figure 8:
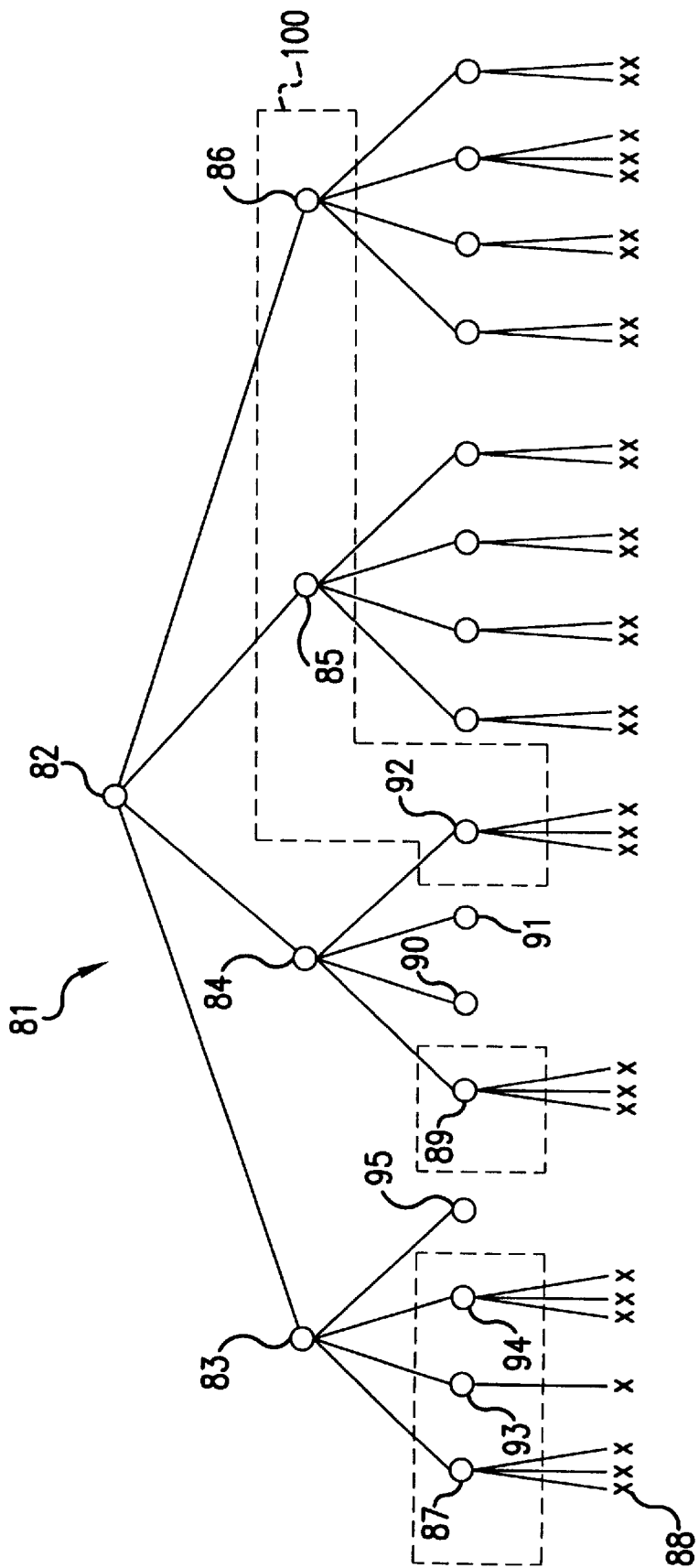
Figure 9:
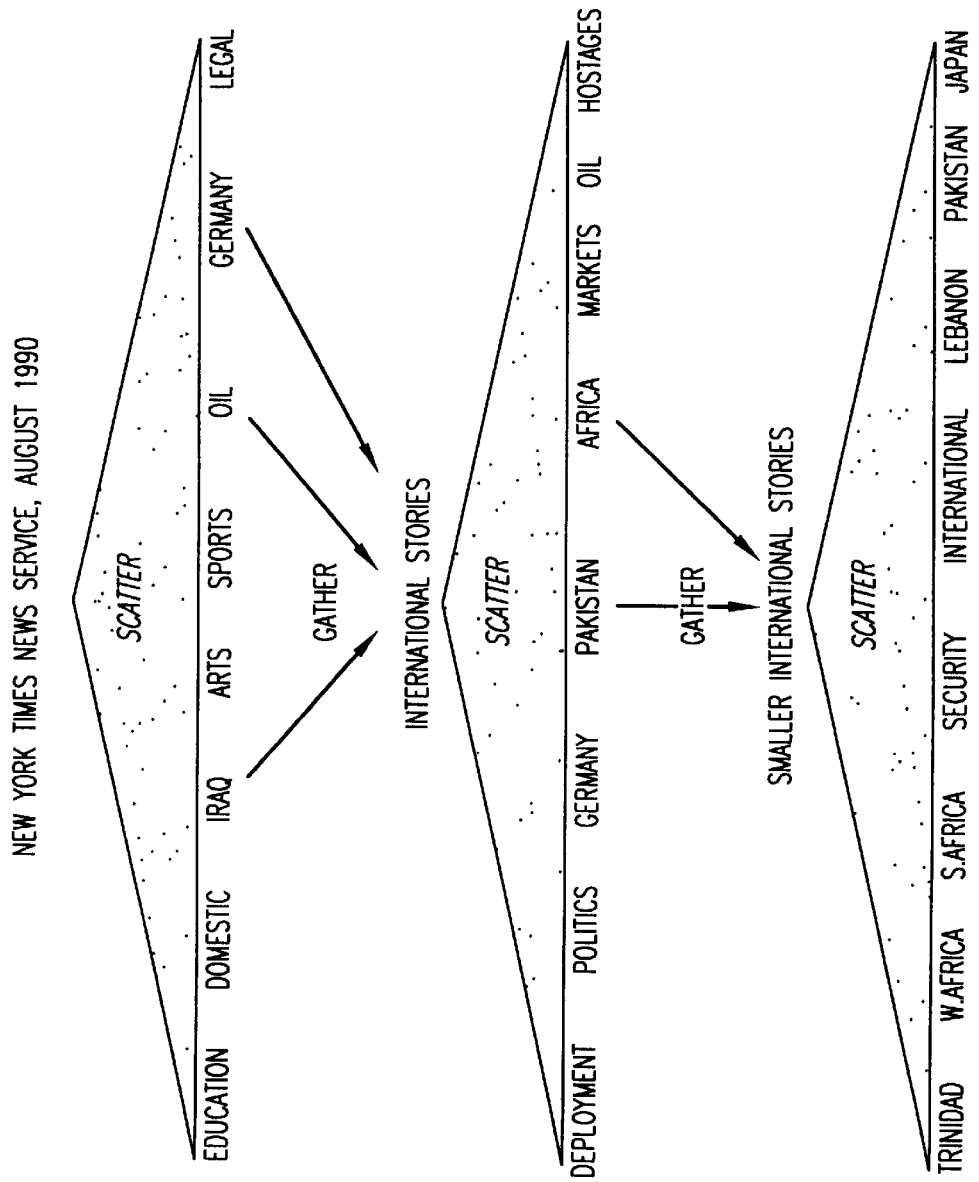
FIG. 9 is a diagram broadly illustrating the Scatter/Gather procedure.
Figure 10:
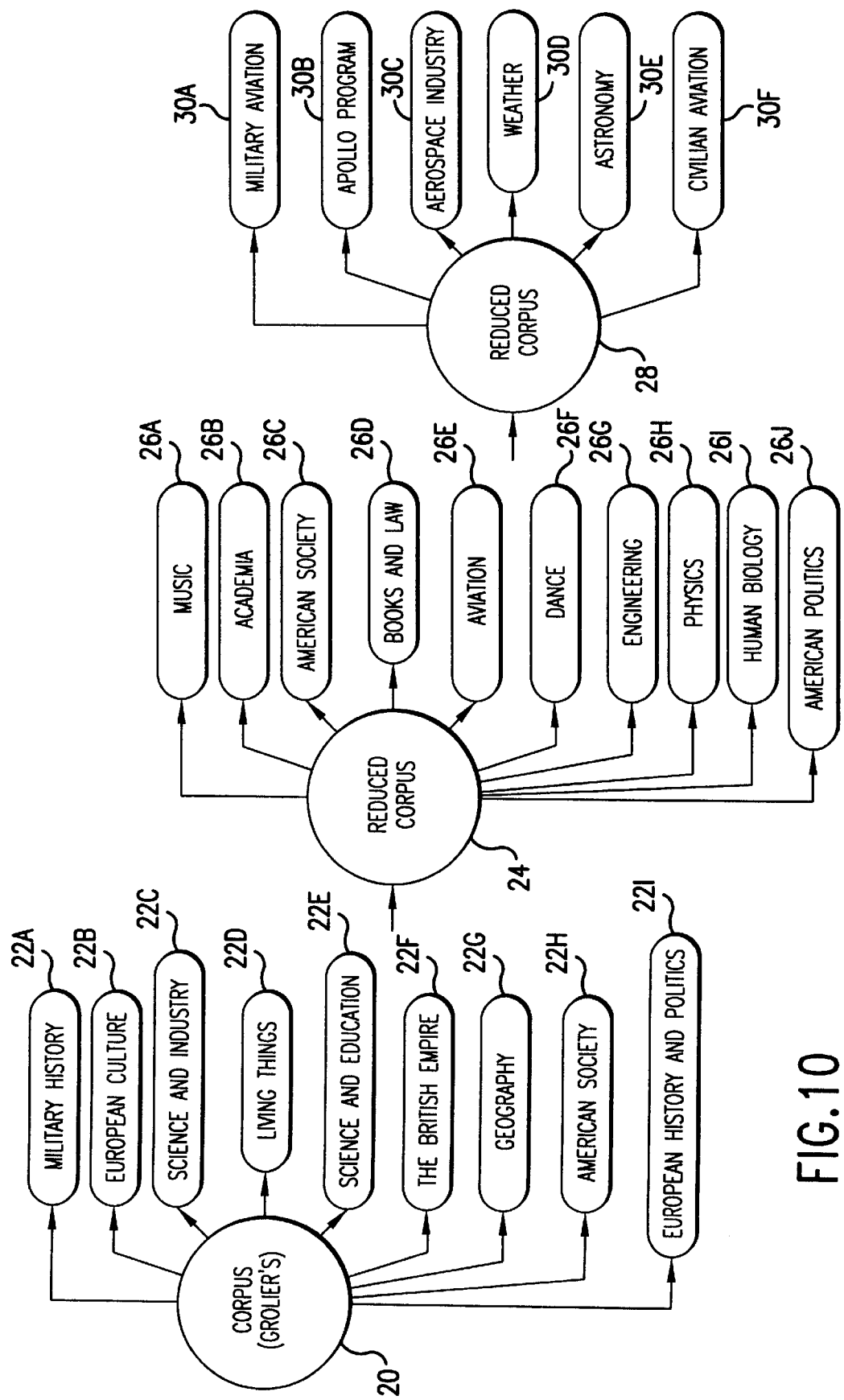
FIG. 10 illustrates the conventional Scatter/Gather document browsing method applied to a specific corpus of documents.

If the predetermined maximum number of metadocuments has not yet been reached in step S360, step S340 is repeated with respect to the focus set 100 shown in FIG. 7. The child metadocument 83, representing the least number of individual documents, is chosen and expanded in step S350 into its descendant, or grandchildren, metadocuments 87 and 93–95, as shown in FIG. 8. However, since the metadocument 95 does not contain any documents of interest, the metadocument 95 is pruned. Therefore, the focus set 100 then contains the descendant metadocuments 85–87, 89, and 92–94.

The process outlined in FIGS. 2, 3 or 4, and 5 continues as long as the number of metadocuments, in the focus set is less than the predetermined maximum number. When the predetermined maximum number is high enough, the focus set will eventually include individual documents. In that case, step S360 will determine whether the total number of metadocuments and individual documents is less than the predetermined maximum number. This situation, however, usually will not occur, particularly during the first few iterations of the process.

As shown in FIG. 1, the reclustering system 10 is preferably implemented on a programmed general purpose computer. However, the reclustering system 10 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device which can implement a finite state machine capable of implementing the flowcharts shown in FIGS. 2–5 can be used to implement the reclustering system 10.

While this invention has been described in conjunction with the specific embodiments outline above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method of processing a corpus of electronically stored documents to cluster one or more previously identified documents of interest, comprising:
   expanding a focus set, the focus set including at least one initial metadocument representative of a plurality of documents, into a plurality of subsequent metadocuments, each subsequent metadocument being a subset of the initial metadocument, the expanding step comprising:
   choosing a metadocument in the focus set,
   expanding the chosen metadocument into its descendant metadocuments,
   replacing the worst descendant metadocument with the children of said worst descendant metadocument,
   pruning the children of the worst descendent metadocument that do not include at least one document of interest, and
   repeating the choosing and expanding steps until a number of the subsequent metadocuments is at least equal to a predetermined maximum number; and
   clustering the subsequent metadocuments into a predetermined number of clusters.

2. The method of claim 1, wherein the predetermined number of clusters is less than the predetermined maximum number.

3. The method of claim 1, wherein the at least one initial metadocument is a single metadocument representative of an entire corpus of documents.

4. The method of claim 1, wherein the predetermined maximum number is determined so that the expanding and clustering steps together will be completed within a time constraint.

5. The method of claim 1, further comprising:
   determining a summary of the new metadocuments; and
   presenting the summary to a user.

6. The method of claim 5, wherein the summary includes:
   a fixed number of topical words that occur most often in each new metadocument; and
   the title of at least one typical document within each new metadocument.

7. The method of claim 1, wherein the clustering step takes at most a predetermined amount of time regardless of the number of documents represented by each metadocument.

8. The method of claim 1, wherein the expanding step further comprises determining whether the number of documents of interest in the chosen metadocument is above a cutoff value.

9. The method of claim 8, wherein if the number of documents of interest in the chosen metadocument is below the cutoff value, the documents are added to a separate document set.

10. The method of claim 9, wherein the expanding step further comprises adding the separate document set to the subsequent metadocuments for clustering in the clustering step.

11. An apparatus for processing a corpus of electronically stored documents to cluster at least one document of interest, comprising:

expansion means for expanding a focus set, the focus set including at least one initial metadocument representative of a plurality of documents, into a plurality of subsequent metadocuments, each subsequent metadocument being a subset of the at least one initial metadocument, comprising:

choosing means for choosing a metadocument in the focus set, the expansion means expanding the chosen metadocument into its descendant metadocuments, replacing means for replacing the worst descendant metadocument with the children of the worst descendant metadocument, and pruning means for pruning the children of the worst descendent metadocument that do not include at least one document of interest; and clustering means for clustering the subsequent metadocuments into a predetermined number of clusters;

wherein the expansion means expands the focus set until a number of the subsequent metadocuments is at least equal to a predetermined maximum number.

12. The apparatus of claim 11, wherein the predetermined number of new metadocuments is less than the predetermined maximum number.

13. The apparatus of claim 11, wherein the at least one initial metadocument is a single metadocument representative of the entire corpus of documents.

14. The apparatus of claim 11, wherein the predetermined maximum number is determined so that the clustering means will complete the clustering of the subsequent metadocuments within a time constraint.

15. The apparatus of claim 11, further comprising a summary means for determining a summary of the new metadocuments and presenting the summary to a user.

16. The apparatus of claim 15, wherein the summary includes:

a fixed number of topical words that occur most often in each new metadocument; and the title of at least one typical document within each new metadocument.

17. The apparatus of claim 11, wherein the clustering means takes at most a predetermined amount of time regardless of the number of documents represented by each metadocument.

18. The apparatus of claim 11, wherein the expanding means determines whether the number of documents of interest in the metadocument is above a cutoff value.

19. The apparatus of claim 18, wherein, when a number of documents of interest in the metadocument is below the cutoff value, the documents are added to a separate document set.

20. The apparatus of claim 19, wherein the expanding means adds the separate document set to the subsequent metadocuments for clustering by the clustering means.

* * * * *